(12) United States Patent
Brede et al.

(10) Patent No.: US 10,915,107 B2
(45) Date of Patent: Feb. 9, 2021

(54) METHOD FOR THE OPERATION OF AN AUTOMATICALLY MOVING CLEANING APPLIANCE

(71) Applicant: Vorwerk & Co. Interholding GmbH, Wuppertal (DE)

(72) Inventors: Maike Brede, Witten (DE); Pia Hahn, Schwelm (DE); Lorenz Hillen, Wuppertal (DE); Gerhard Isenberg, Cologne (DE); Harald Windorfer, Mettmann (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 0 days.

(21) Appl. No.: 16/059,616

(22) Filed: Aug. 9, 2018

(65) Prior Publication Data

US 2019/0049979 A1   Feb. 14, 2019

(30) Foreign Application Priority Data

Aug. 11, 2017   (DE) .......................... 10 2017 118 383

(51) Int. Cl.
*G05D 1/02*   (2020.01)
*G05D 1/00*   (2006.01)
(Continued)

(52) U.S. Cl.
CPC ........... *G05D 1/0219* (2013.01); *G01C 21/30* (2013.01); *G05D 1/0044* (2013.01);
(Continued)

(58) Field of Classification Search
CPC .. G05D 1/0219; G05D 1/0274; G05D 1/0238; G05D 2201/0203; G01C 21/30; A47L 2201/04; A47L 2201/06; G01S 5/16
See application file for complete search history.

(56) References Cited

U.S. PATENT DOCUMENTS

2005/0166355 A1 *   8/2005   Tani ...................... A47L 9/2852
                                                              15/319
2005/0192707 A1      9/2005   Park et al.
(Continued)

FOREIGN PATENT DOCUMENTS

DE    10 2008 014 912 A1    9/2009
DE    10 2011 000 536 A1    8/2012
(Continued)

*Primary Examiner* — Yazan A Soofi
*Assistant Examiner* — Naeem Taslim Alam
(74) *Attorney, Agent, or Firm* — Collard & Roe, P.C.

(57) ABSTRACT

A method for the operation of a cleaning appliance automatically moving within an environment, wherein the cleaning appliance cleans a surface in accordance with a predetermined work schedule, wherein at least one level of contamination of the surface is determined, and a cleaning task is controlled as a function of the level of contamination. In order to make the cleaning operation more flexible and individual, the level of contamination is entered on a map associated with positional information of the environment, wherein a user undertakes editing of the map, that is to say, defines on the map surface zones of the surface and manually assigns a cleaning task of the cleaning appliance to at least one surface zone.

8 Claims, 1 Drawing Sheet

(51) Int. Cl.
*G01C 21/30* (2006.01)
*G01S 5/16* (2006.01)

(52) U.S. Cl.
CPC ........ *G05D 1/0274* (2013.01); *A47L 2201/04* (2013.01); *A47L 2201/06* (2013.01); *G01S 5/16* (2013.01); *G05D 1/0238* (2013.01); *G05D 2201/0203* (2013.01)

(56) References Cited

U.S. PATENT DOCUMENTS

| | | | |
|---|---|---|---|
| 2007/0100496 A1 | 5/2007 | Forell | |
| 2012/0095791 A1* | 4/2012 | Stefik | G08B 25/12 705/5 |
| 2012/0222224 A1 | 9/2012 | Yoon et al. | |
| 2012/0247510 A1 | 10/2012 | Chen et al. | |
| 2012/0259481 A1* | 10/2012 | Kim | G05D 1/0044 701/2 |
| 2013/0025085 A1* | 1/2013 | Kim | A47L 9/2857 15/319 |
| 2013/0030750 A1* | 1/2013 | Kim | G06N 3/004 702/108 |
| 2014/0124004 A1 | 5/2014 | Rosenstein et al. | |
| 2014/0207282 A1* | 7/2014 | Angle | H04L 67/125 700/257 |
| 2014/0278252 A1 | 9/2014 | Wold et al. | |
| 2015/0212520 A1* | 7/2015 | Artes | G05D 1/0219 701/2 |
| 2016/0135655 A1* | 5/2016 | Ahn | G05D 1/0044 134/56 R |
| 2016/0206170 A1 | 7/2016 | Yi et al. | |
| 2017/0007091 A1 | 1/2017 | Walz et al. | |
| 2017/0325647 A1* | 11/2017 | Kwak | A47L 9/2852 |
| 2018/0074508 A1 | 3/2018 | Kleiner et al. | |
| 2018/0194006 A1 | 7/2018 | Gu et al. | |
| 2018/0232134 A1* | 8/2018 | Ebrahimi Afrouzi | B25J 9/1666 |
| 2018/0344114 A1* | 12/2018 | Scholten | A47L 9/2894 |
| 2018/0344116 A1* | 12/2018 | Schriesheim | A47L 9/2857 |
| 2018/0360283 A1 | 12/2018 | Hackert et al. | |
| 2018/0360285 A1 | 12/2018 | Erkek et al. | |
| 2019/0045992 A1 | 2/2019 | Brede et al. | |
| 2019/0049976 A1 | 2/2019 | Erkek et al. | |
| 2019/0049978 A1 | 2/2019 | Brede et al. | |
| 2019/0049979 A1 | 2/2019 | Brede et al. | |
| 2019/0094869 A1* | 3/2019 | Artes | G05D 1/0044 |
| 2019/0155302 A1 | 5/2019 | Lukierski et al. | |
| 2019/0176321 A1* | 6/2019 | Afrouzi | G05D 1/0044 |

FOREIGN PATENT DOCUMENTS

| | | |
|---|---|---|
| EP | 1 711 873 B1 | 12/2012 |
| EP | 1 967 116 B2 | 5/2015 |

\* cited by examiner

METHOD FOR THE OPERATION OF AN AUTOMATICALLY MOVING CLEANING APPLIANCE

CROSS REFERENCE TO RELATED APPLICATIONS

Applicant claims priority under 35 U.S.C. § 119 of German Application No. 10 2017 118 383.3 filed on Aug. 11, 2017, the disclosure of which is incorporated by reference.

BACKGROUND OF THE INVENTION

1. Field of the Invention

The invention relates to a method for the operation of a cleaning appliance automatically moving within an environment, wherein the cleaning appliance cleans a surface in accordance with a predetermined work schedule, wherein at least one level of contamination of the surface is determined and a cleaning task is controlled as a function of the level of contamination.

Furthermore, the invention relates to a cleaning appliance automatically moving within an environment, which is designed to clean a surface in accordance with a defined work schedule, wherein the cleaning appliance has a detection device for purposes of detecting a level of contamination of the surface, and wherein the cleaning appliance is equipped to access a map associated with positional information of the environment.

2. Description of the Related Art

Cleaning appliances of the above-cited type, together with methods for their operation, are of known prior art.

The cleaning appliances can take the form, for example, of mobile robots, which can independently perform a suction task and/or a wiping task within an environment.

The publications DE 10 2011 000 536 A1 and DE 10 2008 014 912 A1 disclose, for example, methods in conjunction with automatically moveable suction and/or cleaning robots for the cleaning of floors. The robots are fitted with distance sensors that can measure distances to obstacles, such as, for example, items of furniture or room boundaries. From the measured distance data, an environmental map is created, on the basis of which a movement itinerary of the robot can be planned, which avoids any collisions with obstacles. The distance sensors preferably operate without contact, for example, using light and/or ultrasound. It is furthermore of known art to provide the robot with means for all-round distance measurement, for example with an optical triangulation system, which is arranged on a platform or similar rotating about a vertical axis. The distance data recorded are processed by means of a computing device of the robot into an environmental map and stored, so that in the course of a work operation recourse can be made to this environmental map for orientation purposes.

From EP 1 967 116 B2 it is furthermore of known art to control the operation of a cleaning appliance automatically, for example in that a detection device of the cleaning appliance detects a level of contamination of the surface to be cleaned and the cleaning process is thereupon automatically adjusted such that a cleaning intensity of an area of the environment is controlled in a subsequent cleaning cycle as a function of the level of contamination.

In addition, it is of known art for a user to detect contamination of a surface to be cleaned, and to control the cleaning appliance manually, for example by way of a remote control device, to the level of contamination in order to execute a spot cleaning process with predefined parameters.

A disadvantage of the methods of known art is that the cleaning operation of the robot and its parameters are automatically adjusted by a control device of the cleaning appliance, without the user having an individual option to influence the method.

SUMMARY OF THE INVENTION

Based on the above-cited prior art, it is therefore an object of the invention to configure the cleaning operation of the cleaning appliance in a more flexible and individual manner.

To achieve this object, it is proposed that the level of contamination is entered into a map associated with positional information of the environment, wherein a user undertakes editing of the map, that is to say, defines surface zones of the surface on the map and manually assigns a cleaning task of the cleaning appliance to at least one surface zone.

In accordance with the invention, the user can now actively intervene in a cleaning plan for the cleaning appliance and can control the cleaning appliance on the basis of the level of contamination detected. By this means the responsibility for fulfilment of the cleaning tasks lies with the user. In particular, the user can individually specify how intensively a surface zone of the surface is to be processed, for example, in order to avoid damage to sensitive floor coverings. The cleaning appliance cleans one or a plurality of surface zones of an environment, for example a surface zone of a room or an apartment, wherein the cleaning appliance records and maps the features of the environment. For this purpose, for example, distances to obstacles within the environment are measured, which are then converted to positional information regarding the obstacles and entered on the map. The map can be an environmental map of the cleaning appliance, which has been created from distance measurement data of the environment, and on the basis of which the cleaning appliance orients itself for purposes of navigation and self-localisation. Alternatively, the map can also be a map that is separate from the environmental map, which is associated with the positional information stored in the environmental map. The determination of the level of contamination, and/or the entry of the level of contamination on the map, can be done manually by a user, or automatically by devices of the cleaning appliance.

The level of contamination can be detected over a multiplicity of cleaning cycles of a cleaning operation. The contamination of the surface can include, for example, dust, hair, liquids and similar. The cleaning appliance creates a map from the detection results, in which levels of contamination of a plurality of surface zones are preferably shown. This map can be either the environmental map of the cleaning appliance, in which in addition to the spatial information the levels of contamination are also entered, or a map that is separate from the environmental map, which is associated with the environmental map. Coordinates of the environmental map are thereby assigned to the levels of contamination. A map containing the levels of contamination is then displayed to the user. On the basis of this map, the user can define one or a plurality of surface zones and define a cleaning task that is desired for the respective surface zone.

Provision can be made for a detection device of the cleaning appliance to detect a level of contamination of the surface. The detection device can monitor the level of contamination continuously, or can detect levels of contamination at fixed or random intervals. In particular, levels of contamination can be detected in a plurality of surface zones of the surface, wherein the level of contamination is assigned to specific positions on the map. The level of contamination can be detected by means of a detection device designed as an image capture device. The detection device takes, for example, images of the surface, and compares these with reference images whose level of contamination is known. Alternatively, however, the detection device can also be a particle detector that measures particles within a suction airflow sucked in by a motor-fan unit. Furthermore information concerning type of pollution, contamination distribution, consistency of contamination, etc. can be associated with the level of contamination.

It is proposed that the user defines a position and in addition a shape and/or size for the surface zones. The user can thus specify on the map a surface zone, which is defined by its position, and in addition in terms of its shape and/or size. For example, the user selects an area on the map and assigns it a geometric shape, such as, for example, a square, a rectangle, a polygon, a triangle, a circle, or a free form. Additionally or alternatively, a size of the surface zone can be defined.

It is further proposed that one or a plurality of cleaning activities be defined in terms of time of execution, frequency of repetition, and/or number of repetitions. For example, the user can specify a frequency of repetition for the selected surface zones. This can be done, for example, in the form of a work schedule that sets recurring cleaning times, for example, daily at 12:00, daily at 8:00 and 20:00, weekly on Fridays at 15:00, and similar. Furthermore, repetitions of cleaning activities can also be defined, inter alia, in the form of a fixed number of crossings of a surface zone by the cleaning appliance.

In addition, provision can be made for the user to allocate to a surface zone that has contamination above a threshold value, a frequency of repetition that is higher than a standard frequency of repetition, and/or an increased cleaning intensity compared to a standard cleaning intensity, and/or for the user to allocate to a surface zone that has contamination below a threshold value, a frequency of repetition that is lower than a standard frequency of repetition, and/or a reduced cleaning intensity compared to a standard cleaning intensity. In accordance with this embodiment, one or a plurality of standard parameters can thus be defined in principle for a cleaning operation of the cleaning appliance. These standard parameters include, for example, a standard frequency of repetition for a recurring cleaning operation, and/or a standard cleaning intensity with which a surface zone is cleaned. The standard cleaning intensity can, for example, be defined in terms of a certain number of cleaning cycles during the cleaning operation in the defined surface zone, or in terms of a cleaning intensity applied by a cleaning element of the cleaning appliance to the surface zone. In particular, the cleaning intensity can also be determined by the suction power of a motor-fan unit of the cleaning appliance. A known contamination is thus compared with a threshold value, wherein the user thereupon takes measures to define a cleaning frequency and/or a cleaning intensity. In particular, an evaluation device of the cleaning appliance can execute a comparison with defined threshold values and then transmit a message, in particular also a recommendation, to the user concerning an adjustment of the standard parameters. The cleaning appliance can preferably suggest to the user a certain increased/reduced cleaning frequency, and/or an increased/reduced cleaning intensity, which the user can define by confirming these for the respective surface zone.

Furthermore, it is proposed that the user create a work schedule that includes successive cleaning tasks in terms of time in a plurality of surface zones. The work schedule thus also defines a plurality of cleaning activities that the cleaning appliance has to execute in succession. By way of example, the work schedule can have successive cleaning steps in adjacent surface zones. Furthermore, it is also possible for the work schedule to provide, for example, cleaning with an increased/reduced cleaning intensity, compared to a standard mode, at surface zones of the environment that are positioned apart from one another. This can, for example, be a so-called spot cleaning of individual surface zones, wherein the user has previously defined the surface zones for such spot cleaning. The surface zones are processed in a specific order in terms of time, and with defined parameters. Only after a complete execution of the work schedule does the cleaning appliance return, for example, to a starting position.

Alternatively, provision can be made for a cleaning activity in a first surface zone to be executed independently, in terms of time and organisation, of cleaning activities in other surface zones. In accordance with this embodiment, the cleaning appliance is assigned only a single cleaning activity, which can thus be controlled completely independently, that is to say, independently in terms of time and organisation, of other missions of the cleaning appliance. In accordance with this embodiment, the cleaning appliance moves only to a single surface zone of the environment, where it executes a cleaning operation.

Furthermore, it is proposed that the map be displayed to the user on an external terminal device, and that the user undertakes editing of the map by way of the external terminal device. The external terminal device is, particularly preferably, a mobile terminal device of the user, in particular a mobile phone, a tablet computer, a laptop, or similar. The map is displayed to the user, in particular on a screen, particularly preferably on a touch screen, of the external terminal device. By way of an input interface of the external terminal device, a keyboard or the touch screen, the user can transmit an input to the external terminal device, and/or can undertake editing of the map. The editing of the map can, in particular, include the definition of surface zones, together with the assignment of a specific cleaning task to these surface zones. To this end the user can, for example, select an area on the map and, as previously explained, can define at least one property, such as shape and/or size, together with a cleaning activity regarding its time of execution, frequency of repetition, and/or number of repetitions. The parameters selected by the user are then transmitted from the external terminal device to the cleaning appliance. For this purpose, a wireless communications link preferably exists, in particular WLAN, Bluetooth, or similar.

It is further proposed that those surface zones to which a cleaning task has been assigned by the user be cleaned in terms of time before surface zones to which no cleaning task has been assigned. In the event that the user has defined a specific cleaning task for a surface zone, the cleaning appliance preferably cleans firstly the surface zones predetermined by the user. Only then are the remaining surface zones of the surface cleaned. Furthermore, within the framework of a work schedule, a specific sequence can be created for the surface zones taken into account in the allocation, or also for surface zones to which no cleaning task has been assigned.

Furthermore, provision can be made to prevent a cleaning task assigned to a surface zone from being altered, deleted, or overwritten, without the user's intervention. Thus, any automatic adjustment of a cleaning activity can be prevented from taking place without the user's knowledge, if, for example, the detection device detects an altered level of contamination. Before any alteration to a cleaning activity, at least the consent of the user is obtained. Only then can a cleaning task be adjusted, by virtue of an altered level of contamination, for example.

In addition to the above-described method for the operation of a cleaning appliance, the invention further proposes a cleaning appliance that moves automatically within an environment and is designed to clean a surface in accordance with a predetermined work schedule, wherein the cleaning appliance has a detection device for purposes of detecting a level of contamination of the surface, and wherein the cleaning appliance is equipped to access a map associated with positional information of the environment. In accordance with the invention, the cleaning appliance is designed for purposes of executing a method as described above. This includes the fact that the cleaning appliance has an input interface for purposes of receiving input data from the user, which define a surface zone of the surface on the map and assign a cleaning task to at least one surface zone. A control device of the cleaning appliance is also designed such that the surface zone defined by the user is entered on the map and a cleaning activity is controlled in accordance with the cleaning task. The cleaning appliance can furthermore have a memory, which contains, for example, reference values for the levels of contamination of one or a plurality of surface zones. These reference values can, for example, be associated with cleaning frequencies and/or cleaning intensities of the cleaning appliance to be used if certain levels of contamination are present. Furthermore, the advantages and features described above regarding the method also apply correspondingly to the inventive cleaning appliance.

BRIEF DESCRIPTION OF THE DRAWINGS

In what follows the invention will be described in more detail with the aid of examples of embodiment. Here.

DETAILED DESCRIPTION OF THE PREFERRED EMBODIMENTS

Figure 1:
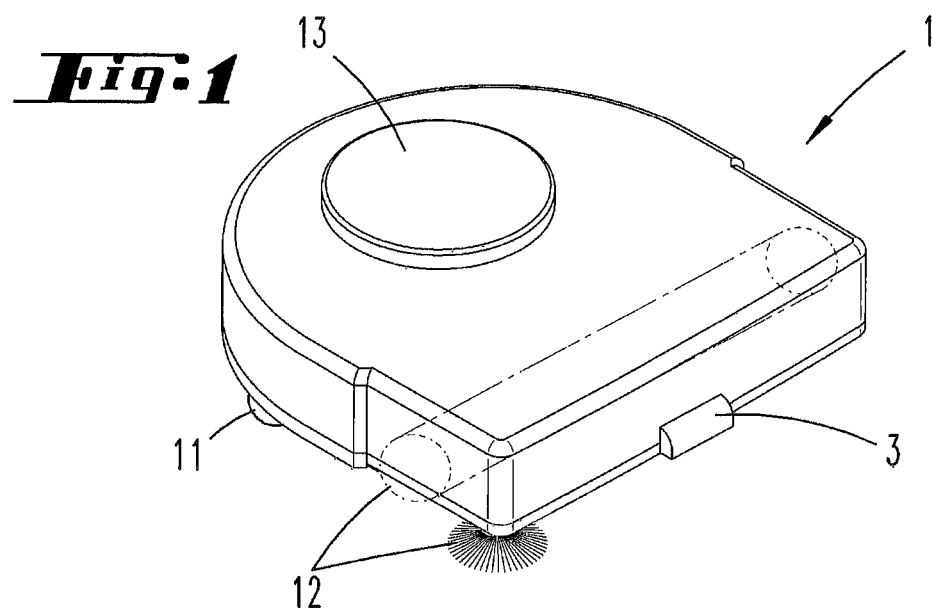
FIG. 1 shows a view in perspective of an automatically moving cleaning appliance.

FIG. 1 shows a cleaning appliance 1, which here is designed as a suction robot. The cleaning appliance 1 has wheels 11 driven by one or more electric motors, with the aid of which the cleaning appliance 1 can move within an environment. Furthermore, the cleaning appliance 1 has cleaning elements 12, that is to say here a side brush protruding laterally beyond a housing of the cleaning appliance 1, and a bristle roller, which can rotate about an axis of rotation. In the conventional operating position of the cleaning appliance 1 as illustrated the bristle roller—with regard to the latter's longitudinal extent—is horizontally oriented, that is to say, essentially parallel to a surface 2 to be cleaned. The cleaning elements 12 serve to release dirt from the surface to be cleaned 2. Furthermore, the cleaning appliance 1 has a suction mouth, not shown, in the vicinity of the cleaning elements 12, via which air loaded with suction detritus can be sucked into the cleaning appliance 1 by means of a motor-fan unit. For the supply of power to the individual electrical components of the cleaning appliance 1, for example, to an electric motor for driving the wheels 11, the cleaning elements 12, or also any other electronics provided, the cleaning appliance 1 has a rechargeable battery, not shown.

The cleaning appliance 1 also has a distance measuring device 13, which here includes, for example, a triangulation measuring device. The distance measuring device 13 is arranged within the housing of the cleaning appliance 1, and in particular has a laser diode whose emitted light beam is guided out of the housing by way of a deflection device, and which can rotate about an axis of rotation perpendicular to the orientation of the cleaning appliance 1, in particular with a measuring angle of 360°. By this means an all-round distance measurement about the cleaning appliance 1 is possible. The distance measuring device 13 measures distances to obstacles 10 within the environment of the cleaning appliance 1, for example distances to items of furniture or room boundaries.

The cleaning appliance 1 also has a detection device 3, that is to say, a dust sensor that is here arranged in front of the cleaning appliance 1 in the direction of travel, which can detect contamination of a surface region 5, 6, 7, 8 currently being traversed by the cleaning appliance 1. Here the dust sensor is, for example, an image capture device, in particular a camera, which records images of the surface zones 5, 6, 7, 8 and compares them with images of reference levels of contamination. Alternatively, however, provision could also be made for the detection device 3 to be, for example, a particle sensor, which measures particles, in particular dust and dirt particles, within a suction airflow sucked in by the motor-fan unit of the cleaning appliance 1.

Figure 2:
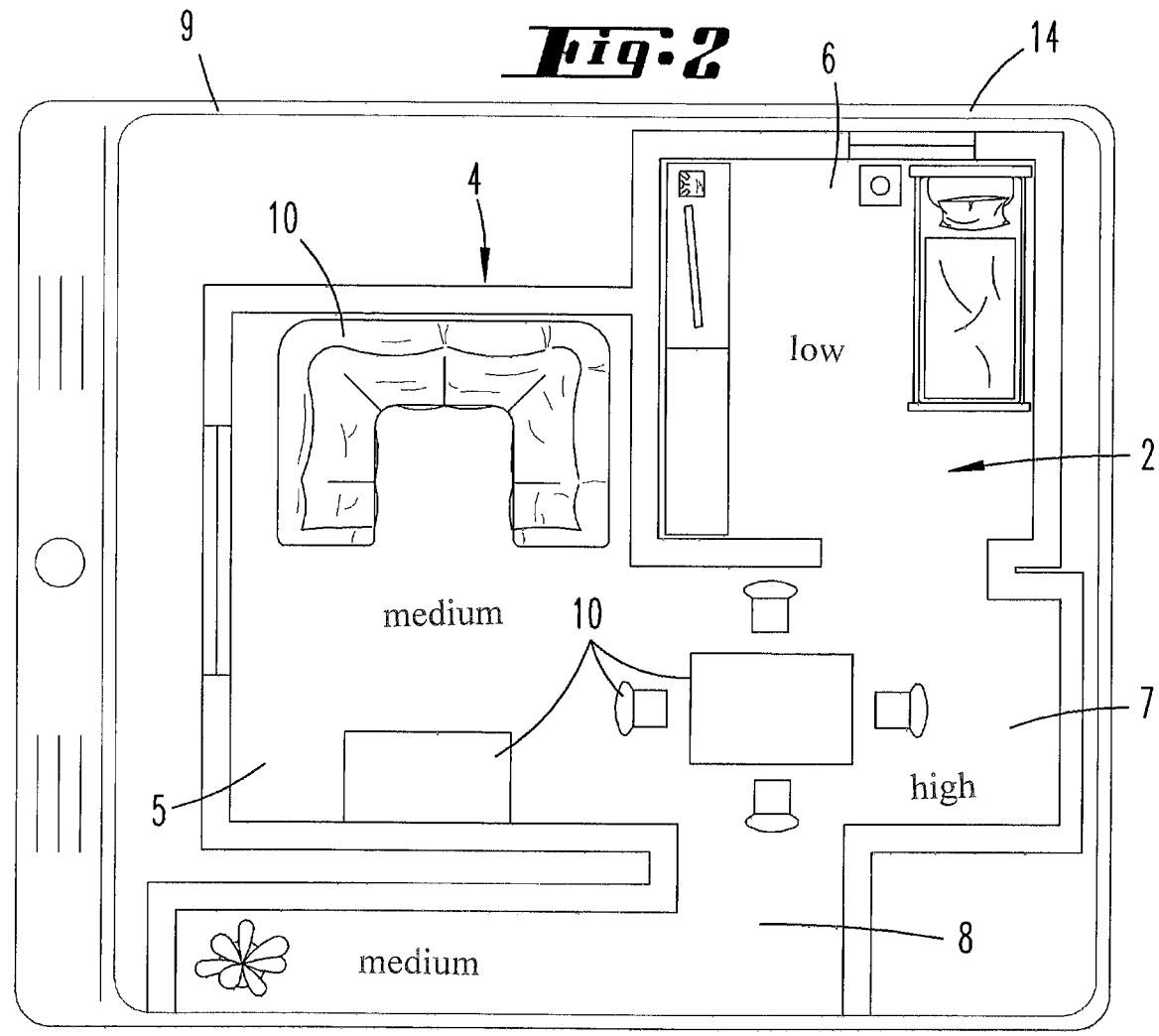
FIG. 2 shows an external terminal device with a map displayed on a screen, which includes surface zones of an environment.

FIG. 2 shows an external terminal device 9, which has a communications link with the cleaning appliance 1. Here, for example, the external terminal device 9 is a tablet computer. The cleaning appliance 1 and the external terminal device 9 have a wireless communications module, for example a WLAN module. On a screen 14 of the external terminal device 9, a map 4 of the environment of the cleaning appliance 1 is shown. Here the map 4 is an environmental map of the cleaning appliance 1, which depicts an apartment with a plurality of rooms. Furthermore, on the map 4 "low", "medium" and "high" levels of contamination are assigned to individual surface zones 5, 6, 7, 8.

To create the map 4, the cleaning appliance 1, during a cleaning or reconnaissance journey, detects levels of contamination of the environment by means of the detection device 3, and enters these on the map 4. The cleaning appliance 1 thereupon transmits the map 4 to the external terminal device 9, where the map 4 is displayed on the screen 14 to a user. The user can select one or a plurality of surface zones 5, 6, 7, 8 on the map 4 and can define a cleaning plan, that is to say, at least one cleaning task, desired for these surface zones 5, 6, 7, 8. If the user does not enter any input data for the map 4, the cleaning appliance 1 performs cleaning activities, for example, in accordance with a standard work schedule. However, if the user enters a specification for one or a plurality of selected surface zones 5, 6, 7, 8, the cleaning appliance 1 first cleans the selected surface zones 5, 6, 7, 8 as defined by the user, and subsequently only those surface zones 5, 6, 7, 8, to which the user has not assigned a cleaning task.

After the user has selected a certain surface zone 5, 6, 7, 8 on the map 4, he assigns this a cleaning task, and optionally also defines a geometric shape for the surface zone 5, 6, 7, 8, such as a square, rectangle, polygon, triangle and/or circle, and/or adjusts its size. In addition, the user can define a cleaning frequency for the desired cleaning activity for the respective surface zone 5, 6, 7, 8, for example daily cleaning at a specific time, cleaning recurring weekly, a certain number of repetitions of a cleaning activity on the respective surface zone 5, 6, 7, 8, and similar. Here the user compares a level of contamination entered on the map 4 with corresponding reference values. If the contamination has, for example, a "high" value, the user can define a cleaning intensity of a cleaning element 12 of the cleaning appliance 1 that is greater than the cleaning intensity usually exerted by the cleaning element 12 on the surface part 5, 6, 7, 8.

Furthermore, the user can also create a work schedule that contains successive cleaning tasks in terms of time for a plurality of surface zones 5, 6, 7, 8. The cleaning appliance 1 then works through the created work schedule completely, wherein the surface portions 5, 6, 7, 8 are cleaned one after another in a defined sequence. Here provision can be made, for example, for the surface zone 7 having a high level of contamination in accordance with FIG. 2 to be cleaned ahead of the surface zones 5 and 8 having a medium level of contamination and the surface zone 6 having a low level of contamination.

Furthermore, it is recommended that a work schedule created by the user or a cleaning task assigned to a surface zone 5, 6, 7, 8 is not automatically altered, deleted or overwritten by, for example, a control device of the cleaning appliance 1, if the detection device 3 currently detects, for example, levels of contamination of the surface portions 5, 6, 7, 8 deviating from the map 4. Before any alteration in the work schedule, or the defined cleaning task, the cleaning appliance 1 preferably transmits at least one item of information to a user, which is particularly preferably displayed on the screen 14 of the external terminal device 9. Furthermore, provision can also be made for the user to receive a request to confirm a proposed alteration to the work schedule. The user can then decide whether the work schedule, or the cleaning task, is to be modified or not.

LIST OF REFERENCE SYMBOLS

1 Cleaning appliance
2 Surface
3 Detection device
4 Map
5 Surface zone
6 Surface zone
7 Surface zone
8 Surface zone
9 External terminal device
10 Obstacle
11 Wheel
12 Cleaning element
13 Distance measuring device
14 Screen

What is claimed is:

1. A method for the operation of a cleaning appliance automatically moving within an environment, comprising:
cleaning a surface that has multiple surface zones with the cleaning appliance in accordance with a predetermined work schedule, the predetermined work schedule setting recurring cleaning times of identical cleaning activities, the cleaning times being defined in advance by a calendrical day and time with regard to a same one of the surface zones in advance with fixed distances of time between recurring cleaning times defining a standard frequency of repetition as a number of cleaning events per unit of time for multiple successive cleaning activities in the same one of the surface zones,
determining at least one level of contamination of the surface, and controlling a cleaning task as a function of the at least one level of contamination,
wherein the detection device takes images of the surface and compares these images with multiple different reference images whose level of contamination is known and defined as one of low, medium or high, or wherein the detection device measures an amount of particles within a suction airflow sucked in by a motor-fan unit and compares these with multiple different reference amounts of particles whose level of contamination is known and defined as one of low, medium or high,
entering the at least one level of contamination with a specification of one of low, medium or high on a map associated with positional information of the environment, wherein the at least one level of contamination is classified by the cleaning appliance in one of the categories low, medium or high,
editing the map by a user by defining surface zones of the surface in the map, and
manually assigning a cleaning task of the cleaning appliance to at least one of the surface zones, wherein the assigned cleaning task is defined in terms of time and execution,
wherein for a surface zone that has a level of contamination below a threshold value, subsequent cleaning tasks are assigned by the user a frequency of repetition that is lower than the standard frequency of repetition of the predetermined work schedule,
wherein an evaluation device of the cleaning appliance executes a comparison with the threshold value of the level of contamination and then transmits a recommendation to the user concerning an adjustment of the standard frequency of repetition.

2. The method in accordance with claim 1, wherein the step of determining takes place with the detection device.

3. The method in accordance with claim 1, wherein the step of defining the surface zones includes defining a position and a shape and/or size of the surface zones.

4. The method in accordance with claim 1, further comprising a step of creating a work schedule, which contains successive cleaning tasks in terms of time in a plurality of surface zones.

5. The method in accordance with claim 1, wherein a cleaning task in a first surface zone is executed in terms of time and organization independently of cleaning tasks in other surface zones.

6. The method in accordance with claim 1, further comprising a step of displaying the map to the user on an external terminal device, and wherein the step of editing takes place by way of the external terminal device.

7. The method in accordance with claim 1, wherein those surface zones to which a cleaning task has been assigned are cleaned before surface zones to which no cleaning task has been assigned, and/or wherein a cleaning task assigned to a surface zone is prevented from being altered, deleted, or overwritten, without the user's intervention.

8. A cleaning appliance automatically moving within an environment, which is designed to clean a surface in accordance with a predetermined work schedule, comprising:

a detection device for purposes of detecting a level of contamination of the surface, wherein the detection device is configured to take images of the surface and compare these images with multiple different reference images whose level of contamination is known and defined as one of low, medium or high, or wherein the detection device measures an amount of particles within a suction airflow sucked in by a motor-fan unit and compares these with multiple different reference amounts of particles whose level of contamination is known and defined as one of low, medium or high, and a map associated with positional information of the environment, the map being accessible by the cleaning appliance, wherein the cleaning appliance is configured for controlling a cleaning task as a function of the level of contamination, wherein the map is configured to receive information about the level of contamination, wherein the map is configured to be edited by a user to define multiple surface zones of the surface in the map and to manually assign a cleaning task of the cleaning appliance to at least one of the surface zones wherein the assigned cleaning task is defined in terms of time of execution, wherein the predetermined work schedule comprises a subsequent cleaning of the at least one surface zone according to a defined frequency of repetition, such that the predetermined work schedule sets recurring cleaning times of identical cleaning activities, the cleaning times being defined in advance by a calendrical day and time with regard to a same one of the surface zones in advance, with fixed distances of time between recurring cleaning times defining a standard frequency of repetition defined as a number of cleaning events per unit of time for multiple successive cleaning activities in the same surface zone, and wherein for a surface zone that has a level of contamination below a threshold value, subsequent cleaning tasks are assigned by the user a frequency of repetition that is lower than the standard frequency of repetition of the predetermined work schedule, and further comprising an evaluation device of the cleaning appliance that is configured to execute a comparison with the threshold value of the level of contamination and then transmit a recommendation to the user concerning an adjustment of the standard frequency of repetition.

* * * * *